Feb. 7, 1950 S. K. LEHMAN ET AL 2,496,729
FLUID PRESSURE CONTROL
Original Filed Nov. 29, 1941
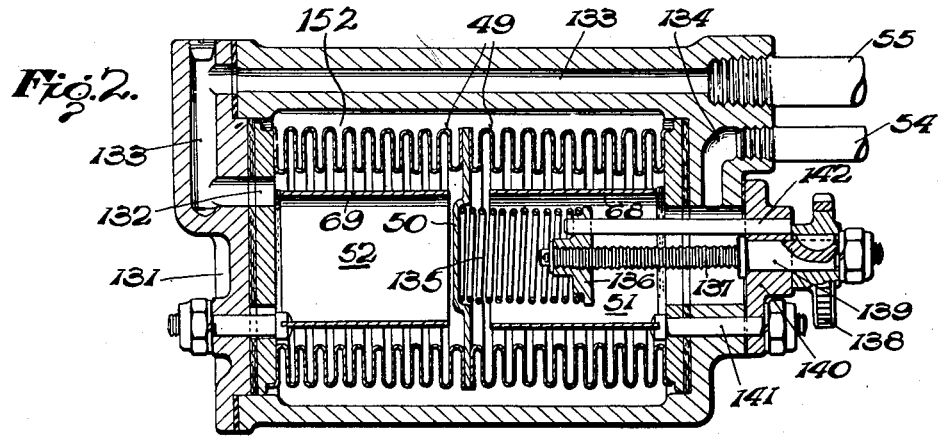
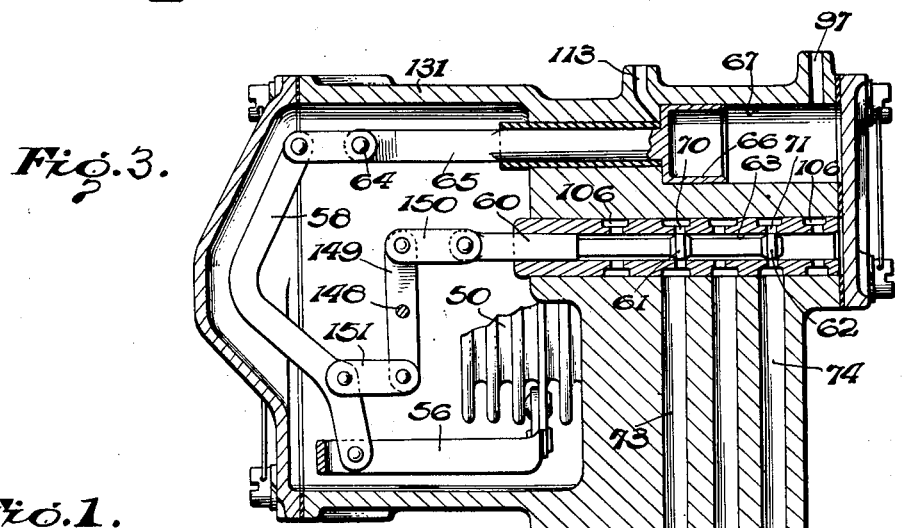
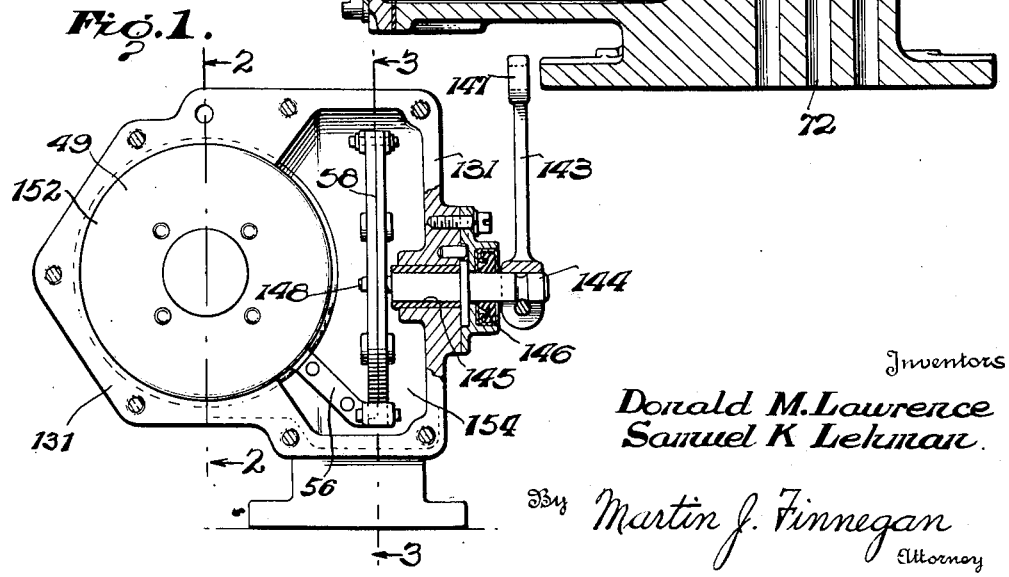
Inventors
Donald M. Lawrence
Samuel K Lehman
By Martin J. Finnegan
Attorney Patented Feb. 7, 1950

2,496,729

UNITED STATES PATENT OFFICE 2,496,729

FLUID PRESSURE CONTROL

Samuel K. Lehman, Brooklyn, N. Y., and Donald M. Lawrence, Caldwell, N. J., assignors to Bendix Aviation Corporation, South Bend, Ind., a corporation of Delaware Original application November 29, 1941, Serial No. 421,082, now Patent No. 2,390,487, dated December 4, 1945. Divided and this application July 14, 1943, Serial No. 494,726

2 Claims. (Cl. 137—153)

This invention relates to pressure control devices for fluid flow systems, and more particularly to a device for a system for controlling the rate of flow of air to a supercharged aircraft cabin.

This application is a division of our copending application, Serial No. 421,082, filed November 29, 1941, and issued December 4, 1945 as Patent No. 2,390,487.

As scheduled aircraft flight at the higher altitudes is already an accomplished fact, systems have been devised for controlling the pressure and rate of flow of air to the passengers in a sealed and supercharged cabin.

It is an object of the invention to provide a device for a fluid flow control system wherein a desired rate of fluid flow is maintained through pressure sensitive elements operating suitable monitoring servo-motors.

It is another object of the invention to provide a device for a fluid flow control system wherein automatic means are incorporated for preventing the maintenance of excessive rates of flow.

Other objects of the invention include the provision of a pressure sensitive device for permitting the circulation of a working fluid in accordance with predetermined conditions, and the provision of a temperature responsive device for controlling the circulation of a working fluid in accordance with predetermined temperature changes.

Other objects will appear from a study of the following specification when made in conjunction with the attached drawings, throughout which like numerals designate like parts.

Fig. 1 is an end elevation, with parts in section, of a device constructed in accordance with the invention;

Fig. 2 is a longitudinal sectional view taken along the line 2—2 of Figure 1; and Fig. 3 is another sectional view of the device taken along the line 3—3 of Figure 1.

As shown in the drawing, a housing 131 contains bellows 49 in a chamber 152 and the servo-valve system having parts heretofore described in the parent application. Chamber 52 has a port 132 formed in one end, which is in communication with a channel 133 formed in housing 131. This channel terminates in a screw-threaded connection with conduit 55. A similar compartment 51 is in communication with conduit 54 by means of a channel 134 formed in housing 131 and opening into compartment 51. Abutments 68 and 69 are shown as cylindrical metal sleeves welded or otherwise attached to the end faces of the end walls of compartments 51 and 52, respectively. An initial pressure balance between the compartments 51 and 52 is obtained by means of the helical spring 135, which has one end abutting against the dividing wall 50, and its other end carried in a traveling nut or screw-face plate 136, which is carried on an axially stationary rotatable screw-threaded member 137 which terminates in an adjusting knob 138 exteriorly of the housing 131. The shank portion 139 of screw-threaded member 137 is formed with a smooth cylindrical surface, and has a gas-tight fit with the closure member 140 that is held tightly pressed against housing 131 by means of a plurality of bolts 141. A guide bar 142 extends through closure 140 and through an aperture in the face plate 136. It will be seen without further explanation that the initial pressure balance for any particular installation may be manually set by means of the adjusting mechanism specified immediately above.

In Fig. 1, a crank arm 143 is connected to a shaft 144 which passes through an opening in a wall 156 into a compartment 154 of the housing 131, which opening is provided with a suitable sleeve bearing 145 and packing gland 146. Crank arm 143 has a transverse bore 147 in its outer end for connection to the pilot's flow-control.

Shaft 144 carries at its inner end an eccentric stub shaft portion or pin member 148, which passes through an intermediate link or beam member 149 (Fig. 3), which is connected at its upper end to rod 60 through a loose link 150, and at its lower end to a link or lever 58 by means of another loose link 151. The lever 58 is pivotally mounted at its lower end on a pivot mounting 56 carried by the wall 50. A link 64 is pivotally connected to and between the piston 66 in cylinder 67 and the lever 58, the cylinder having passageway means 97 and 113 at opposite sides of the piston.

Servo-valve members 61 and 62 are carried within valve chamber or receptacle 63, having radially disposed port openings 70 and 71, respectively, connected to the pressure channels 73 and 74, respectively.

Upon displacement of the eccentric pin 148 by rotation of crank arm 143 under control of the pilot, the link 149 is translated to the left or to the right, as viewed in Fig. 3, and thus, changes the center of rotation of the linkage system controlled by wall 50 connected to servo-valves 61 and 62 through the linkage. The valves 61 and 62 are permanently disposed between relief channels 106. The effect of translating the link 149, and therefore, the pivot afforded by pin 148, is the same as that obtained schematically by the vertical motion of link 47 in Fig. 1 of the parent application.

When the pilot adjusts the flow control, and thus translates the pivot point of link 149 to the right or to the left, as shown in Fig. 3, then dividing wall 50 will be moved toward one of the abutments 68 and 69 acting as means limiting opposite axial movements of the wall, and valves 61 and 62 will be moved from their positions shown in Fig. 3 to permit oil under pressure from channel 72 to be directed into either of the channels 73 or 74.

In describing the device of the present invention, only one embodiment has been discussed. It is understood, however, that the invention is not restricted to this exemplary embodiment, but is to be limited only by the scope of the appended claims.

What is claimed is:

1. In combination, a housing having a chamber, a compartment, a cylinder and a valve receptacle, an axially stationary rotatable member journaled by and having a screw in and operative from outside the housing, a wall axially movable in the chamber, and carrying a lever pivot mounting, a traveling nut held against rotation on the screw, a spring between the wall and the nut, bellows carrying the wall and extending therefrom to opposite ends of the chamber, means limiting opposite axial movements of the wall, conduit means communicating with the bellows at opposite sides of the wall, a piston in the cylinder between passageway means thereof, a valve axially movable in the valve receptacle carrying axially spaced valve members permanently disposed between relief channels of the receptacle and adapted to control fluid flow between a channel of the housing intermediate the valve members and channels of the housing at opposite sides of the intermediate channel, a shaft rotatable from the exterior of the housing extending laterally of the compartment journaled in a wall thereof and having an eccentric portion therein, a beam intermediately pivoted on the eccentric portion, a lever pivoted to the lever pivot mounting, a link pivotally connected to and between the lever and the beam at one side of the eccentric, a link pivotally connected to and between the valve and the beam at the other side of the eccentric, and a link pivotally connected to and between the piston and the lever.

2. In combination, a housing having a chamber, a compartment, a cylinder and a valve receptacle parallel to each other, an axially stationary rotatable member journaled by and having a screw in and operative from outside the housing, a wall axially movable in the chamber, a guide fixed adjacent to one end of the housing normal to the wall and parallel to the screw, a traveling nut on the screw held against rotation by the guide, a spring between the wall and the nut, bellows carrying the wall and extending therefrom to opposite ends of the chamber, means limiting opposite axial movements of the wall, conduit means providing for communication of the bellows from opposite sides of the wall to high and low fluid velocity points, respectively, an arm fixed to and extending axially of the wall in the compartment, a piston in the cylinder between passageway means thereof and having a rod extending into said compartment, a valve rod axially movable in the valve receptacle carrying axially spaced valve members permanently disposed between relief channels of the receptacle and adapted to control fluid flow between a channel of the housing intermediate the valve members and channels of the housing at opposite sides of the intermediate channel, a shaft rotatable from the exterior of the housing extending laterally of the compartment journaled in a wall thereof and having an eccentric axial pin therein, a beam intermediately pivoted on the pin, a lever pivoted to the arm, a link pivotally connected between one end of the beam and the lever, a link pivotally connected between the other end of the beam and the valve rod, and a link pivotally connected between the piston rod and the lever.

SAMUEL K. LEHMAN.
DONALD M. LAWRENCE.

REFERENCES CITED

The following references are of record in the file of this patent:

UNITED STATES PATENTS

| Number | Name | Date |
| --- | --- | --- |
| 1,220,972 | Fulton | Mar. 27, 1917 |
| 1,877,576 | O'Connor | Sept. 13, 1932 |
| 2,057,101 | Kagi | Oct. 13, 1936 |
| 2,248,780 | Pierce | July 8, 1941 |
| 2,314,152 | Mallory | Mar. 16, 1943 |
| 2,316,416 | Gregg | Apr. 13, 1943 |